(12) United States Patent
Muroi et al.

(10) Patent No.: US 7,613,117 B2
(45) Date of Patent: Nov. 3, 2009

(54) MOTION PICTURE DATA TRANSMISSION METHOD AND SYSTEM

(75) Inventors: Yasuyuki Muroi, Tokyo (JP); Akira Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 626 days.

(21) Appl. No.: 11/073,637

(22) Filed: Mar. 8, 2005

(65) Prior Publication Data

US 2005/0246748 A1 Nov. 3, 2005

(30) Foreign Application Priority Data

Mar. 9, 2004 (JP) ............................. 2004-065077

(51) Int. Cl.
*H04J 3/16* (2006.01)
(52) U.S. Cl. .................................... 370/235
(58) Field of Classification Search ................... 348/12; 370/240.16, 241.1, 252, 445, 521; 386/46; 725/90
See application file for complete search history.

(56) References Cited

U.S. PATENT DOCUMENTS

| | | | | |
|---|---|---|---|---|
| 5,912,697 | A * | 6/1999 | Hashimoto et al. | 725/114 |
| 6,003,086 | A | 12/1999 | Mitsutake et al. | |
| 6,097,739 | A | 8/2000 | Yamashita | |
| 2002/0006163 | A1 * | 1/2002 | Hibi et al. | 375/240.16 |
| 2002/0141454 | A1 * | 10/2002 | Muniere | 370/535 |
| 2003/0016630 | A1 * | 1/2003 | Vega-Garcia et al. | 370/252 |
| 2003/0103243 | A1 | 6/2003 | Watanabe et al. | |
| 2003/0163521 | A1 | 8/2003 | Hoshi | |

FOREIGN PATENT DOCUMENTS

| | | |
|---|---|---|
| JP | 09-319671 | 12/1997 |
| JP | 10-079738 | 3/1998 |
| JP | 2000-175189 A | 6/2000 |
| JP | 2001-268134 A | 9/2001 |
| JP | 2001-268134 A | 9/2001 |
| JP | 2003-169090 A | 6/2003 |
| JP | 2003-209594 | 7/2003 |
| JP | 2003-244237 A | 8/2003 |

OTHER PUBLICATIONS

N. Iwami et al., "A Study on Realtime Video Communication over LAN," IEICE Technical Report, Apr. 22, 1994, vol. 94:21 (CS94-9), pp. 61-67.

* cited by examiner

*Primary Examiner*—Chirag G Shah
*Assistant Examiner*—Yong Zhou
(74) *Attorney, Agent, or Firm*—Foley & Lardner LLP

(57) ABSTRACT

A motion picture data transmission method for transmitting motion picture data from a server system via a transmission line to a client system is disclosed. The content of the transmitted motion picture data is checked and the transmission interval in each unit time is adjusted on the basis of the content data of the motion picture data. Thus, it is possible to eliminate missing of data, delay of transmission data, etc., resulting due to lack of uniformity of the transmission data quantity on a transmission line for transmitting motion picture data from a server system to a client system.

9 Claims, 5 Drawing Sheets

MOTION PICTURE DATA TRANSMISSION METHOD AND SYSTEM

BACKGROUND OF THE INVENTION

This application claims benefit of Japanese Patent Application No. 2004-065077 filed on Mar. 9, 2004, the contents of which are incorporated by the reference.

The present invention relates to motion picture data transmission method and system and, more particularly, to motion picture data transmission method and system for transmitting motion picture data by smoothing the load to the transmission line and minimizing the load on the transmission path.

In television telephone sets or the like, the motion picture images picked up by a camera are digitalized are transmitted as packet data in real-time transmission via a transmission line to the opposite side of communication. Prior art techniques concerning such packet image data transmission techniques are disclosed in various literatures. In disclosed data transmission system and method, at the time of image data transmission, the inter-packet transmission interval is adjusted to suppress the occurrence of packet loss in low processing capacity receiving terminals (see Literature 1: Japanese Laid-open 2003-209594, for instance).

In another disclosed data transmission system, the transmission data is divided into packets or like transmission units, divided and transmitted by an electronic mail or like data transmission means having a transmission unit transmission means and a transmission interval coefficient means, thereby preventing occurrence of competition and also preventing data loss and delay of data transmission (see Literature 2: Japanese Patent Laid-open Hei 9-319671, for instance).

The prior art digital motion picture distributing system, however, uses a receiving side receiving buffer for transmission data quantity management, and this leads to the following problems. At the start of motion picture data transmission, a large quantity of motion picture data is transmitted at a high rate in a short period of time. This is done so because at the time of the motion picture data transmission start the receiving side causes a receiving buffer to start receiving data in its empty state and requests motion picture data until the receiving buffer comes to hold a constant quantity of motion picture data. Also, a transmission side processing unit load is increased.

Furthermore, missing of part of the transmitted motion picture data is possible. This is so because with the transmission of a large quantity of motion picture data at a time, part of the motion picture data transmitted in the large quantity may fail to be received and missed. To solve this problem, in the prior art digital motion picture distributing system a packet smoother for adjusting the transmission rate is provided between the server and the transmission line lest a large quantity of packets should flow on the transmission line at a time. Even this technique, however, has the following problem. The packet smoother may not always realize optimum smoothing. This is so because in the case of providing the packet smoother separately from a motion picture distributing server, the packet data smoothed in the packet smoother cannot be recognized up to internal data of motion pictures and therefore cannot be optimized for the motion picture distribution.

SUMMARY OF THE INVENTION

An object of the present invention is therefore to provide a motion picture data transmission method and system capable of eliminating missing of data, delay of transmission data, etc., resulting due to lack of uniformity of the transmission data quantity on a transmission line for transmitting motion picture data from a server system to a client system.

According to an aspect of the present invention, there is provided a motion picture data transmission method for transmitting motion picture data from a server system via a transmission line to a client system, comprising the steps of: checking the content of the transmitted motion picture data; and adjusting the transmission interval in each unit time on the basis of the content data of the motion picture data.

The motion picture data transmission interval is determined on the basis of the size and number of packets and the wait time. The motion picture data to be transmitted is composite data such as image, voice, text and so forth data including time serial data, and the composite data is transmitted with reference to the time data.

According to another aspect of the present invention, there is provided a motion picture data transmission system for transmitting motion picture data from a server system via a transmission line to a client system, wherein: the server system includes a storing unit for storing the motion picture data to be transmitted, and a transmission interval control unit for controlling the interval of transmission of motion picture data read out from the storing unit, the motion picture data transmission interval being controlled automatically according to the transmitted motion picture data.

The transmission interval control unit has a motion picture data dividing means for dividing the motion picture data into a plurality of blocks, and a packet dividing means for dividing packets of the transmitted motion picture data, and a counter. The server system further includes a transmission interval calculating means provided between the storing unit and the transmission interval control unit and serving to calculate the number of continuously transmitted packets, the continuous packet transmission interval and the block transmission interval. A wait means for determining a continuous packet transmission interval between continuous packet transmission numbers is provided.

Other objects and features will be clarified from the following description with reference to attached drawings.

PREFERRED EMBODIMENTS OF THE INVENTION

Preferred embodiments of the present invention will now be described with reference to the drawings.

Figure 1:
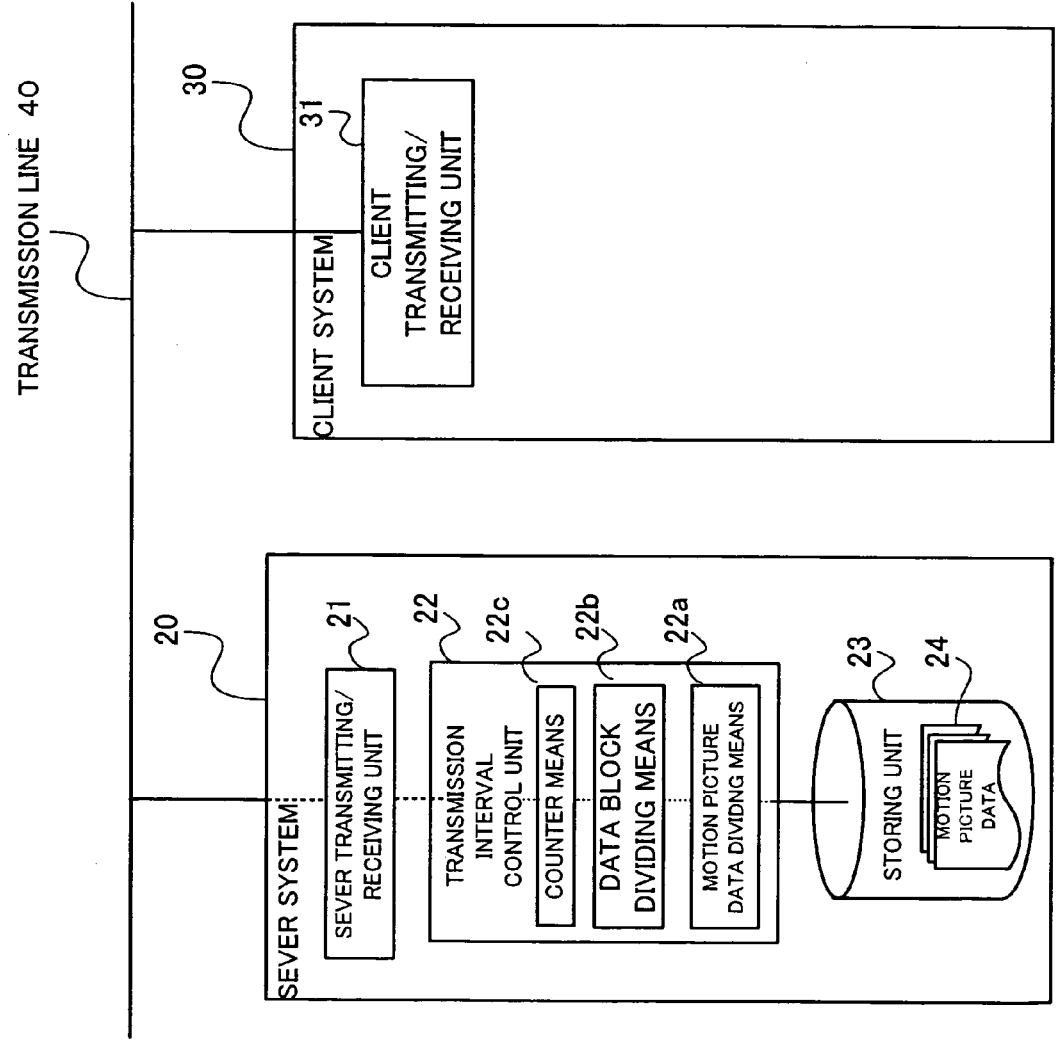
FIG. 1 is a block diagram showing the overall arrangement of a motion picture data transmission system as a first embodiment of the present invention.

FIG. 1 is a block diagram showing the overall arrangement of a motion picture data transmission system as a first embodiment of the present invention. This motion picture data transmission system 10 comprises a server system 20, a client system 30 and a transmission line 40 for interconnecting the server system 20 and the client system 30.

The server system 20 includes a server transmitting/receiving unit 21, a transmission interval control unit 22, and a storing unit 23 for storing or preserving the coded motion picture data 24. The server transmitting/receiving unit 21 has a packet transmission means (not shown). The transmission interval control unit 22 has a motion picture data dividing means 22a, a data block dividing means 22b and a counter 22c. The client system 30 includes a client transmitting/receiving unit 31.

Figure 2:
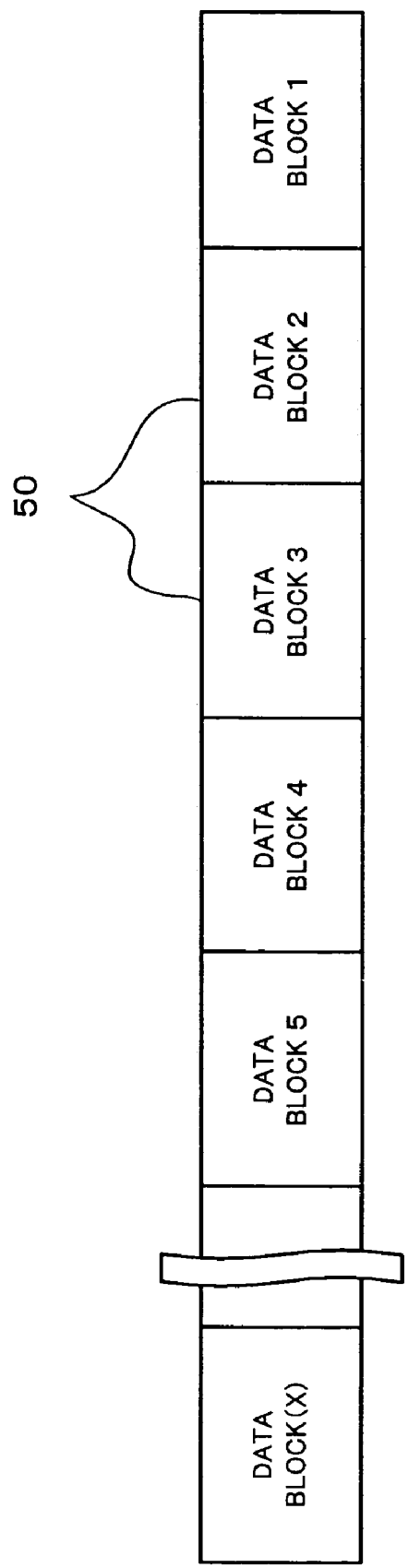
FIG. 2 shows the configuration of the picture data blocks 50 stored in the storing unit 23 in FIG. 1.

FIG. 2 shows the configuration of the picture data blocks 50 stored in the storing unit 23. The storing means 23 is constituted by a plurality of data blocks 50, i.e., data blocks 1 to X, obtained by division in predetermined time units. In each of the data blocks 1 to X, digital motion picture data 24 having been coded in each time unit is stored.

The transmission interval control unit 22, which includes the motion picture data block dividing unit 22a, the data block dividing means 22b and the counter 22c as noted above, holds preset data of transmitted packet length, continuously transmitted packet number, continuous packet transmission interval and continuous block transmission interval. The counter 22c counts the continuously transmitted packets. The client system 30 includes the client transmitting/receiving unit 31, which transmits and receives data to and from the transmission line 40. The client transmission/reception system 31 includes a packet receiving means. The server transmitting/receiving unit 21 and the client transmitting/receiving unit 31 are connected to the transmission line 40 for data transmission between them.

Now, main functions of individual elements will be described. The server transmitting/receiving unit 21 has a packet transmission means, and the server system 20 transmits the motion picture data via the transmission line 40 to the client system 30. The motion picture data block dividing means 22a in the transmission interval control means 22 serves to readout the contents (i.e., internal data) of the motion picture data 24 read out from the storing unit 23 and inputted, and divides the read-out contents to data block units of a constant unit time by recognizing the data clocks.

The data block dividing means 22b divides the motion picture block data from the motion picture data block dividing means 22a to packets of a size suitable for the transmission via the transmission line 40. The counter means 22c counts the continuously transmitted packets. The server and receiving 21 includes a packet receiving means for receiving data transmitted from the server system 20 via the transmission line 40.

The transmission line 40 connects the server transmitting/receiving 21 of the server system 20 and the client transmitting/receiving unit 31 of the client system 30. The transmission line 40 is provided for data transmission between the server transmitting/receiving unit 21 and the client transmitting/receiving unit 31.

FIGS. 3A and 3B are for describing the relation between the data blocks and packets noted above. FIG. 3A shows two continuous data blocks 50, i.e., n-th and (n+1)-th data blocks, of digitalized motion picture data 24 stored in the storing unit 23 shown in FIG. 1. FIG. 3B shows packets 60 transmitted for transmission from the server transmitting/receiving unit 21.

Figure 3:
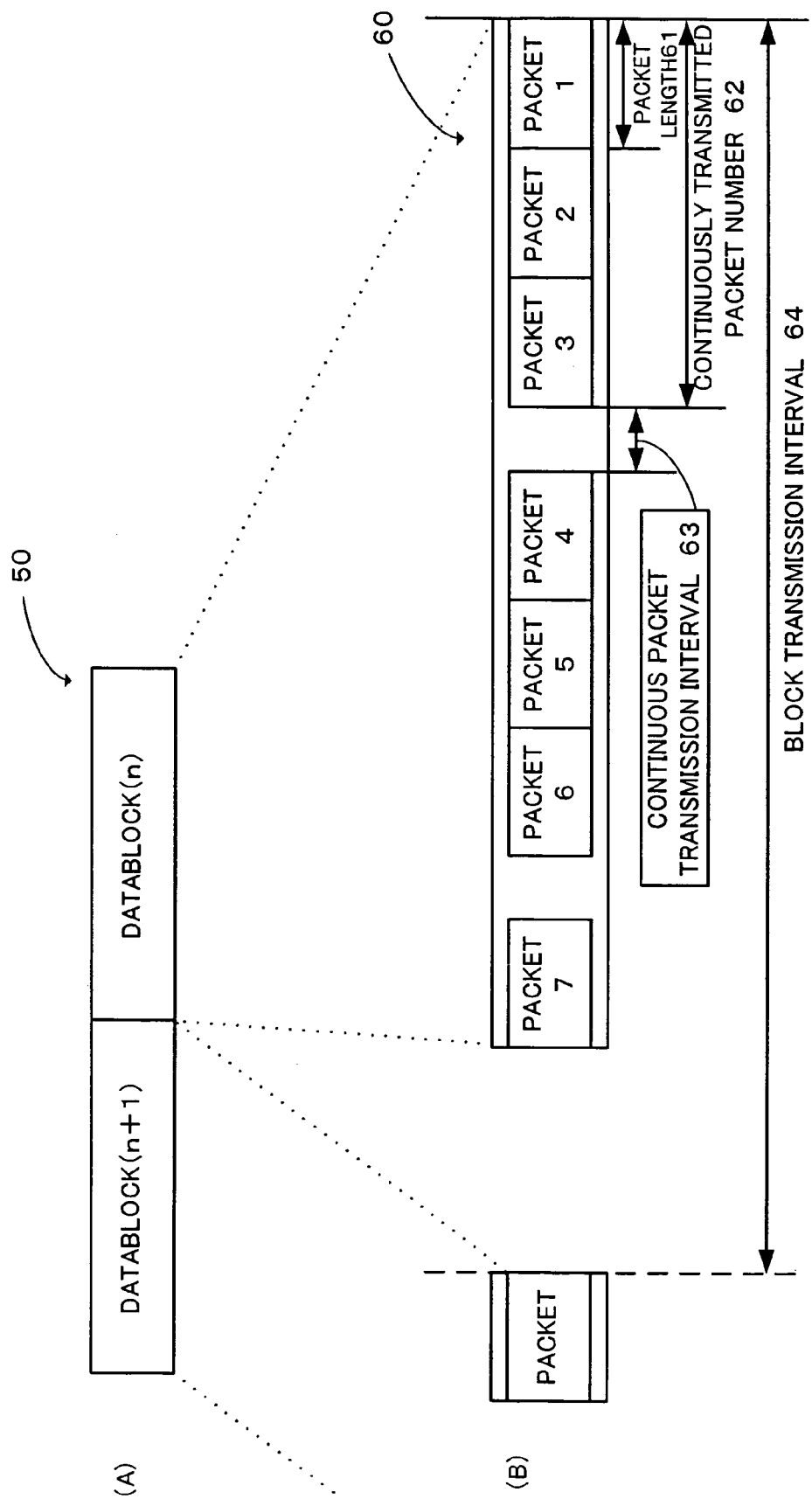
FIGS. 3A and 3B show two continuous data blocks 50 and packets 60.

As shown in FIGS. 3A and 3B, the packet dividing means 22b in the transmission interval control unit 22 in the server system 20 divides the n-th one of the data blocks 50 to a plurality of packets 60 such as packets 1, 2, ..., 7, .... The packets 1 to 7 have a predetermined constant packet length 61. The transmission interval control unit 22 determines a continuously transmitted packet number 62 of a plurality of packets 60. The continuously transmitted packet number 62 is determined to be constituted by three packets 60, such as packets 1 to 3 and packets 4 to 6 in the case of the n-th motion picture, in FIG. 3. A predetermined continuous packet transmission interval 63 is provided between the continuously transmitted packet numbers 62 such as between the packets 3 and 4 and also between the packets 6 and 7. In this way, a data block transmission interval is 64 is determined.

As described above, the transmitted packet length 61 as the length of each packet 60, is defined as one packet length when transmitting the motion picture data 24. The continuous packet transmission interval 62 is defined as a transmission number of the packets 60. The continuous packet transmission interval 63 is defined to be a time interval from the instant of completion of the continuously transmitted packet number of packets 60 till the instant of the start of the next continuous packet transmission. The data block transmission interval 64 is defined as the time interval of transmission of the motion picture image 24 in data block units.

Figure 4:
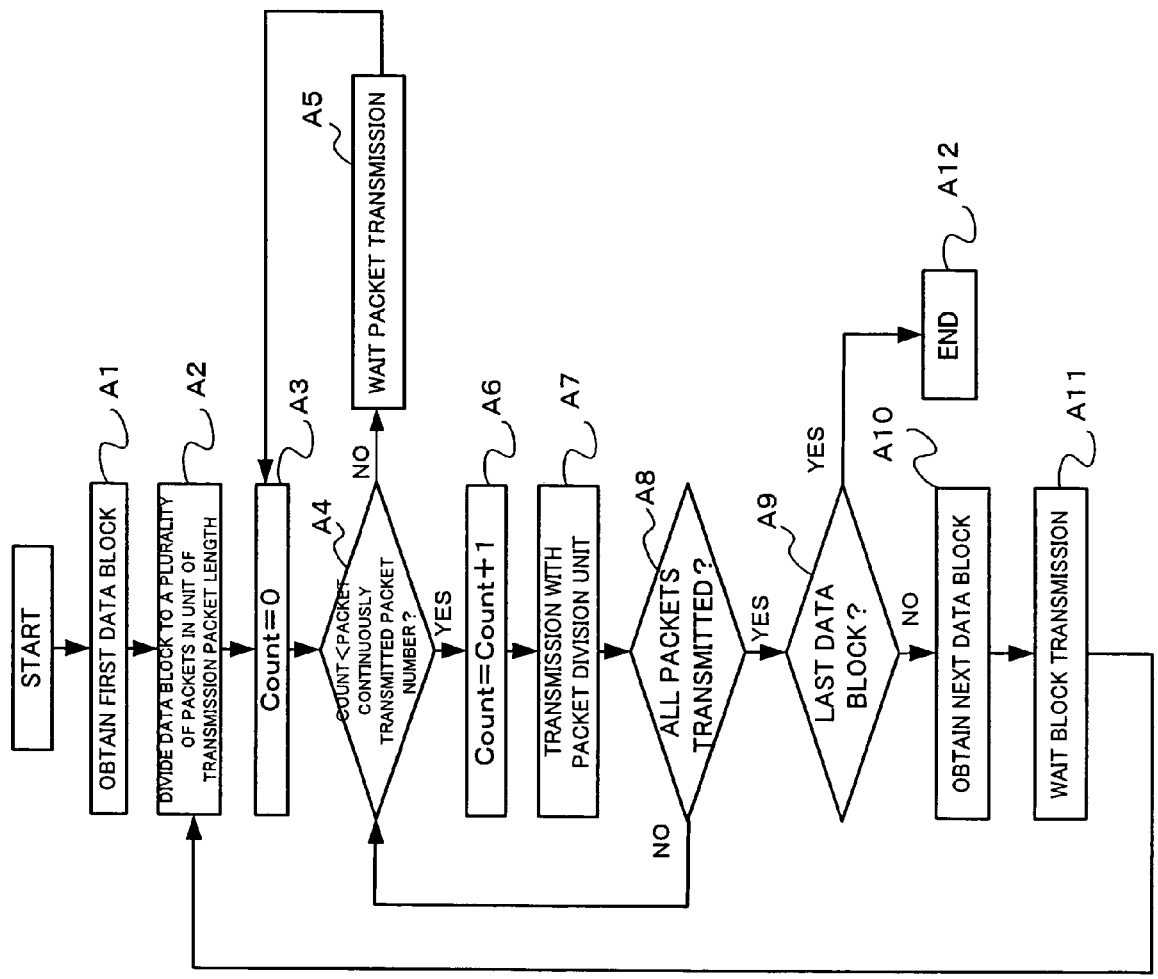
FIG. 4 is a flow chart showing the operation of the first embodiment of the motion picture data transmission system 10 shown in FIG. 1 according to the present invention.

The operation of the first embodiment of the motion picture data transmission system 10 shown in FIG. 1 according to the present invention will be described in detail with reference to the flow chart of FIG. 4. The transmission interval control unit 22 receives the motion picture data 24 read out from the storing unit 23 in the server system 20 reads out the internal data in the motion picture data 24 and divides the read-out data in a predetermined time to obtain a first data block by the motion picture data dividing means 22a (step A1). The control unit 22 then causes the data block dividing means 22b to divide the obtained data block to a plurality of packets in units of the transmission packet length 61 (step A2). At this time, the last packet has a size corresponding to the remainder of the regular data block and may not have the constant transmission packet length.

Then, the transmission interval control unit 22 resets (sets to zero) the counter 22c for counting continuously transmitted packet number 62 (step A3). The control unit 22 then checks whether the count of the counter 22c is less than the continuously transmitted packet number 62 (step A4). When the count is greater than the continuously transmitted packet number 62, ("NO" in step A4), the control unit 22 waits until the lapse of the specified continuous packet transmission interval 63 (step A5). Then, the control unit 22 returns to the above step A3. When the count is less than the continuously transmitted packet number 62 ("YES" in step A4), on the other hand, the control unit 22 increases the count of the counter 22c by one (step S6), and also transmits one packet 60 to the server transmitting/receiving unit 21 (step A7). The server transmitting/receiving unit 21 causes its packet transmitting means to transmit an electronic mail to the client system 30.

Thereafter, the transmission interval control unit 22 checks whether all the packets 60 have been transmitted (step A8). When all of the plurality of packets have not yet been transmitted ("NO" in step A8), the control unit 22 returns to the step A4. When all the packets have been transmitted ("YES" in step A8), the control unit 22 checks whether the data block transmitted right now is the last data block (step A9). When the transmitted data clock is not the last data block ("NO" in step A9), the control unit 22 causes the motion picture data dividing means 22a to obtain the next data block (step A10). Then, the control unit 22 causes a waiting means (not shown) to wait the lapse of the time specified as the data block transmission interval 64 from the instant of end of the previous step A2 (step A11). Then, the process is returned to step A2 for repeating the above operations. When it is found in the step A9 that the transmitted data block is the last data block ("YES" in step A9), it means that all the data blocks have been transmitted. The server system 20 is thus an end to the transmission of motion picture data 24 (step A12).

In the client server 30, the client transmitting/receiving unit 31 causes a packet receiving means to obtain the motion picture data 24 transmitted via the transmission line 40. FIGS. 3A and 3B show, in time series, the status of motion picture data outputted from the transmission interval control unit 22 in the server system 20 to the server transmitting/receiving unit 21.

As described above, the transmission interval control unit 22 causes the block data dividing means 22b to divide the motion picture data 24 of one data block 50 provided from the motion picture data dividing means 22a to a plurality of packets 60. The control unit 22 then repeats the routine of transmitting packets of the packet length 61 in units corresponding to the continuous packet transmission number until there is no packet 60 to be transmitted and then waiting for the continuous packet transmission interval. After the control unit 22 has transmitted motion picture data 24 of one data block, it causes waiting until the lapse of the data block transmission interval 64 from the instant of the start of transmission of the preceding data block 50 before the start of transmission of the motion picture data of the next data block.

Figure 5:
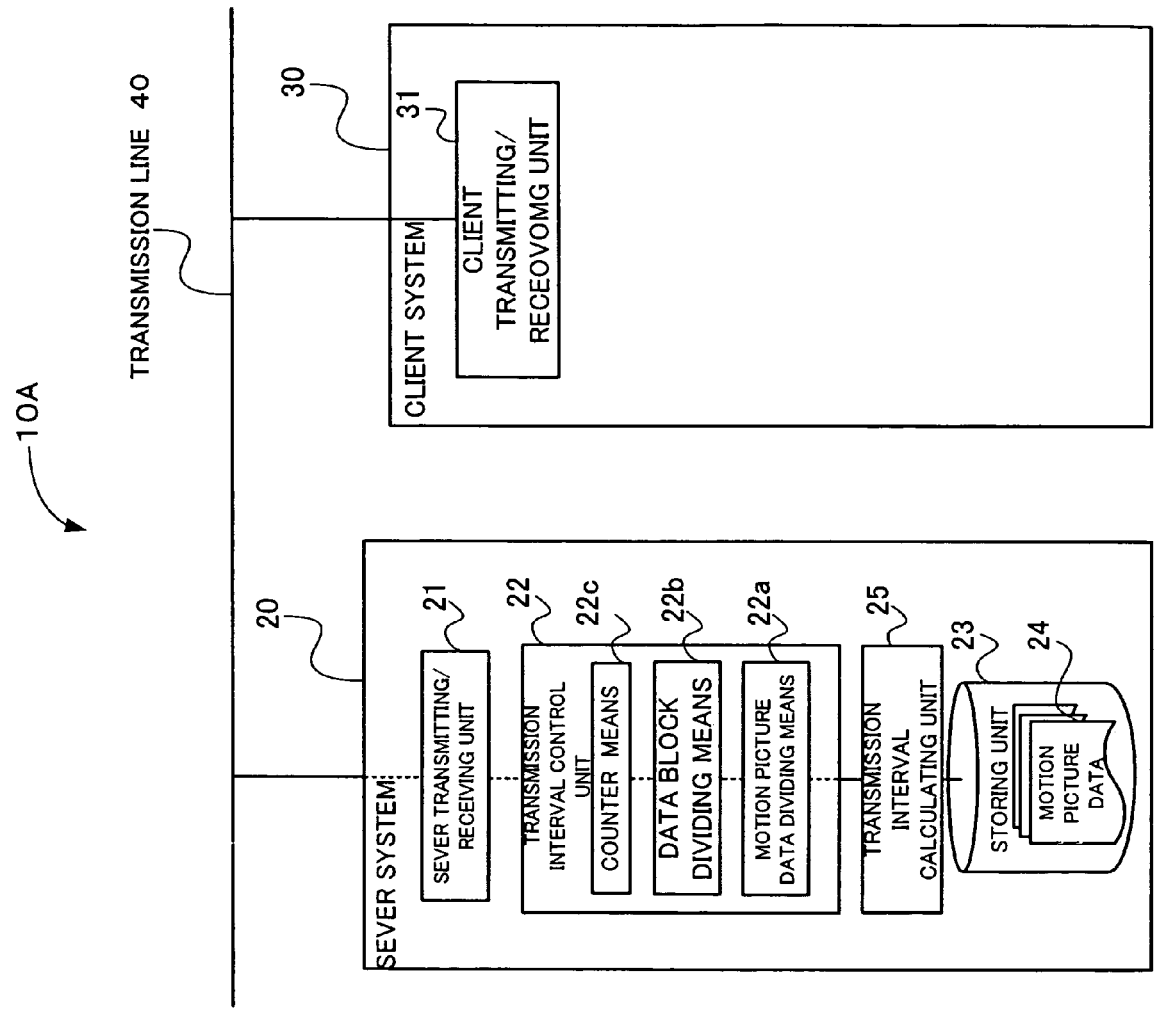
FIG. 5 is a block diagram showing the arrangement of the second embodiment of the motion picture data transmission system 10A according to the present invention.

Now, a second embodiment of motion picture data transmission method and system according to the present invention will be described with reference to FIG. 5. FIG. 5 is a block diagram showing the arrangement of the second embodiment of the motion picture data transmission system 10A according to the present invention. In this embodiment, for the sake of the gravity of description, elements with arrangements like those in the previous first embodiment of the motion picture data transmission system are designated by like reference numerals, and the description will be made mainly in connection with the reference. This motion picture transmission system 10A is different in that a transmission interval calculating unit 25 is newly provided between the storing unit 23 and the transmission interval control unit 22 in the first embodiment shown in FIG. 1.

The transmission interval calculating unit 25 automatically obtains the transmission packet length 61 from the characteristic of the transmission line 40 in use. The unit 25 also reads out the contents of the motion picture data inputted from the storing unit 23, and obtains the unit time and estimated size of one motion picture data block. From these obtained data and the data of the transmission packet length 61, the unit 25 automatically calculates the continuously transmitted packet number 62, the continuous packet transmission interval 63 and the continuous block transmission interval 64, and then transmits the motion picture data 22 to the transmission interval control unit 22. As for the subsequent process in the transmission interval control unit 22 of the second embodiment, the same operation as in the first embodiment shown in FIG. 1 is executed.

A third embodiment of motion picture data transmission method and system according to the present invention will be described. This third embodiment is the replacement of the motion picture data 24 in the first embodiment shown in FIG. 1 with still picture data, character data, voice data or composite data of these data inclusive of time data. In this case, composite data is transmitted while referring to the time data.

With the motion picture transmission method and system according to the present invention, the following pronounced practical effects are obtainable. It is possible, at the motion picture data transmission, to set substantially a constant data quantity that is transmitted to the transmission line per unit time. This is so because the motion picture data is transmitted while adjusting the data packet transmission interval. Also, since the motion data block is transmitted in data block unit through the recognition of motion data block, it is possible, at the motion picture data transmission time, to transmit the transmission data in data block units of motion picture data.

Furthermore, there is no need of manually setting the transmission interval. This is so because of the provision of the transmission interval calculating unit for automatically adjusting the transmission interval. Another reason is the purposes, at the time of transmitting a plurality of motion picture pieces with different quantities of one block, of being able to read out the contents of motion picture data as the subject of distribution and causing automatic calculation of distribution setting data suited for the motion pictures, respectively.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A motion picture data transmission method performed by a server system for transmitting motion picture data from the server system via a transmission line to a client system, comprising the steps of:
   checking the content of the transmitted motion picture data; and
   adjusting the transmission interval in each unit time on the basis of the content data of the motion picture data,
   wherein the adjusting step comprises:
   determining when a number of packets corresponding to the motion picture data consecutively transmitted over the transmission line without any delay in transmission between any of the packets reaches a predetermined number of packets;
   when the number of packets corresponding to the motion picture data consecutively transmitted reaches the predetermined number of packets, providing a wait interval until a next packet corresponding to the motion picture data is to be transmitted of the transmission line; and
   adjusting the transmission interval between consecutive data blocks of packets by inserting a wait interval between a first data block of packets and a second block of packets adjacent to the first data block of packets
   wherein the wait interval is determined based in part on detected transmission characteristics of the transmission line.

2. The motion picture data transmission method according to claim 1, wherein the motion picture data transmission interval is determined on the basis of the size and number of packets.

3. The motion picture data transmission method according to claim 1, wherein the motion picture data to be transmitted is composite data such as image, voice, text and so forth data including time serial data, and the composite data is transmitted with reference to the time data.

4. A motion picture data transmission system for transmitting motion picture data from a server system via a transmission line to a client system, wherein:
   the server system includes a storing unit for storing the motion picture data to be transmitted, transmission line detecting means, and a transmission interval control unit for controlling the interval of transmission of motion picture data read out from the storing unit, the motion picture data transmission interval being controlled automatically according to the transmitted motion picture data, wherein the transmission interval control unit comprises:

a counter configured to count up so as to determine when a number of packets corresponding to the motion picture data consecutively transmitted over the transmission line without any delay in transmission between any of the packets reaches a predetermined number of packets; and wherein, when the number of packets corresponding to the motion picture data consecutively transmitted reaches the predetermined number of packets, the transmission interval control unit provides a wait interval until a next packet corresponding to the motion picture data is to be transmitted of the transmission line, and wherein the wait interval is determined based in part on detected transmission characteristics of the transmission line as determined by the transmission line detecting means, and wherein the transmission interval control unit is further configured to adjust the transmission interval between consecutive data blocks of packets by inserting a wait interval between a first data block of packets and a second block of packets adjacent to the first data block of packets.

5. The motion picture data transmission system according to claim 4, wherein the transmission interval control unit has a motion picture data dividing means for dividing the motion picture data into a plurality of blocks, and a packet dividing means for dividing packets of the transmitted motion picture data.

6. The motion picture data transmitting system according to claim 4, wherein the server system further includes a transmission interval calculating means provided between the storing unit and the transmission interval control unit and serving to calculate the number of continuously transmitted packets, the continuous packet transmission interval and the block transmission interval.

7. The motion picture data transmission system according to claim 6, further comprising wait means for determining a continuous packet transmission interval between continuous packet transmission numbers.

8. The motion picture data transmitting system according to claim 5, wherein the server system further includes a transmission interval calculating means provided between the storing unit and the transmission interval control unit and serving to calculate the number of continuously transmitted packets, the continuous packet transmission interval and the block transmission interval.

9. The motion picture data transmission system according to claim 8, further comprising wait means for determining a continuous packet transmission interval between continuous packet transmission numbers.

* * * * *